(12) United States Patent
Posta

(10) Patent No.: US 10,377,362 B2
(45) Date of Patent: Aug. 13, 2019

(54) BRAKING CONTROL SYSTEM FOR A TRAILER

(71) Applicant: Peter Posta, Old Bridge, NJ (US)

(72) Inventor: Peter Posta, Old Bridge, NJ (US)

( * ) Notice: Subject to any disclaimer, the term of this patent is extended or adjusted under 35 U.S.C. 154(b) by 57 days.

(21) Appl. No.: 15/485,155

(22) Filed: Apr. 11, 2017

(65) Prior Publication Data

US 2017/0305399 A1    Oct. 26, 2017

Related U.S. Application Data

(60) Provisional application No. 62/320,827, filed on Apr. 11, 2016.

(51) Int. Cl.
    *B60T 13/40*      (2006.01)
    *B60T 17/04*      (2006.01)
    *B60T 17/18*      (2006.01)
    *B60T 15/04*      (2006.01)
    *B62D 63/08*      (2006.01)

(52) U.S. Cl.
    CPC .......... *B60T 13/403* (2013.01); *B60T 15/041* (2013.01); *B60T 17/043* (2013.01); *B60T 17/18* (2013.01); *B62D 63/08* (2013.01)

(58) Field of Classification Search
    CPC .... B60T 15/041; B60T 15/043; B60T 15/181; B60T 15/182; B60T 13/40; B60T 13/403; B60T 17/18; B60T 7/20
    USPC ................ 303/75, 89, 123; 251/90
    See application file for complete search history.

(56) References Cited

U.S. PATENT DOCUMENTS

| | | | | |
|---|---|---|---|---|
| 2,659,242 A | * | 11/1953 | Blanning | F16K 35/10 251/90 |
| 3,228,730 A | * | 1/1966 | Schubert | B60T 13/403 303/13 |
| 3,240,537 A | * | 3/1966 | Valentine | B60T 13/268 303/29 |
| 3,410,610 A | * | 11/1968 | Cumming | B60T 13/36 137/87.03 |
| 3,770,324 A | * | 11/1973 | Stevenson | B60T 17/086 303/89 |
| 3,892,444 A | * | 7/1975 | Durling | B60T 13/268 137/596 |
| 4,641,846 A | * | 2/1987 | Ehrhart | B62D 53/068 280/149.2 |
| 5,305,622 A | * | 4/1994 | Flores | F16K 35/06 137/385 |

(Continued)

FOREIGN PATENT DOCUMENTS

| | | | | |
|---|---|---|---|---|
| GB | 655200 A | * | 7/1951 | ............ B60T 13/403 |
| GB | 1434553 A | * | 5/1976 | ............ B60T 15/041 |

(Continued)

*Primary Examiner* — Thomas J Williams
(74) *Attorney, Agent, or Firm* — Walter J. Tencza, Jr.

(57) ABSTRACT

A braking control system for a trailer includes a braking system on a semi-trailer with the brake application handle located at the inside rear of the trailer. The handle has a locking member so that personnel loading the trailer are able to apply and lock the brakes on the trailer, and only the person(s) holding the key are able to release the brakes. The system prevents the trailer from moving away from the dock plate and having the dock plate fall through the space between the moved trailer and the dock, injuring personnel and/or damaging equipment.

8 Claims, 4 Drawing Sheets

(56) References Cited

U.S. PATENT DOCUMENTS

| | | | | |
|---|---|---|---|---|
| 5,368,066 A | * | 11/1994 | Scaramucci | F16K 35/06 137/377 |
| 6,367,888 B1 | * | 4/2002 | Kee | B60R 25/08 180/287 |
| 7,575,285 B2 | * | 8/2009 | Bobby | B60T 15/041 303/118.1 |
| 8,376,472 B1 | * | 2/2013 | Hoffer | B60R 25/08 180/287 |
| 2004/0187222 A1 | * | 9/2004 | Schuette | B08B 5/04 8/148 |
| 2008/0179943 A1 | * | 7/2008 | Weber | B60T 11/102 303/89 |
| 2014/0318903 A1 | * | 10/2014 | Simpson | B60R 25/08 188/1.11 R |

FOREIGN PATENT DOCUMENTS

| | | | | |
|---|---|---|---|---|
| GB | 1563079 A | * | 3/1980 | B60T 3/263 |
| GB | 2049108 A | * | 12/1980 | F16K 35/00 |
| JP | 61016166 A | * | 1/1986 | B60T 13/26 |

* cited by examiner

BRAKING CONTROL SYSTEM FOR A TRAILER

CROSS-REFERENCE TO RELATED APPLICATION

The present application is related to and claims priority from prior provisional application Ser. No. 62/320,827, filed Apr. 11, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of braking systems and more specifically relates to a braking control system for a trailer.

2. Description of the Related Art

Every day, millions of professional truckers travel across the highways transporting goods and products to commercial destinations that provide goods to the general public of modern countries. These trucks transport supplies such as food products, mechanical parts, lubrication products, medical supplies, and building materials just to name a few. The trucking industry and the professional truck drivers are crucial members of the transportation system that modernizes any country that has developed such a system.

Truckers operating tractor trailers must make sure that their vehicle's equipment is running smoothly and safely in order to operate efficiently and reduce the risk of accidents. One of the most important components of any vehicle, particularly long haul trucks, is the vehicle braking system. Unlike automobiles which utilize hydraulic fluid to power brakes, tractor trailers and other heavy vehicles typically utilize compressed air systems, with the advantage being that the air utilized to operate the brakes is always readily available. Air brakes are a type of friction brakes, with compressed air pressing on a piston to apply pressure to the brake pad to stop the vehicle. In the case of the parking brakes, heavy vehicles employ a disc or drum brake assembly which is held in the secure position by applied spring pressure with air pressure delivered from air reservoir tanks through the air line between the compressed air storage tank and the brakes, thus allowing the parking brake to engage.

Making sure that the parking brake is properly engaged is especially important when loading and unloading the vehicle, as the process of transporting goods onto and off a trailer from a loading dock area can be a dangerous activity for lift operators and other workers. Often times, when loading or unloading the trailer, the trailer will inadvertently shift or move due to the weight of a forklift entering or exiting the cargo area. Sometimes, because workers performing these loading and unloading tasks are in motion themselves, they do not realize it when the trailer brakes are not adequately engaged and that the trailer is in fact moving.

According to the Federal Motor Carrier Safety Administration (FMCSA), one of the most common violations faced by truck drivers and the main reason a truck may shift when parked has to do with out-of-service or faulty brakes that allow air pressure to be released from the air line, in turn causing the brakes to release. Not surprisingly, even the slightest movement of the trailer can have dire consequences, particularly if the trailer moves away from the dock plate that is utilized to bridge the distance between the back of the open trailer and the loading dock. When this occurs, the plate can collapse, taking goods being transported on the plate and persons operating the forklift or standing nearby with it as it falls to the ground below. These types of accidents are extremely hazardous and can result in serious injuries or even death to those who are involved, and are too frequent for a number of reasons. Failure to take the time to test the braking systems because of its inconvenience may be the most common reason these types of accidents happen. A solution is needed.

Various attempts have been made to solve the above-mentioned problems such as those found in U.S. Pat. No. 3,085,833 to Schultz Forrest O E; U.S. Pat. No. 3,304,131 to Bueler Richard C; and U.S. Pat. No. 6,652,042 to James J. Johnson. This prior art is representative of braking systems for disconnected trailers. None of the above inventions and patents, taken either singly or in combination, is seen to describe the invention as claimed.

Ideally, a braking system should provide easy access and convenience of testing for the workers loading trailers, and yet, would operate reliably and be manufactured at a modest expense. Thus, a need exists for a reliable braking control system for a trailer to avoid the above-mentioned problems.

BRIEF SUMMARY OF THE INVENTION

In view of the foregoing disadvantages inherent in the known braking systems art, the present invention provides a novel braking control system for a trailer. The general purpose of the present invention, which will be described subsequently in greater detail, is to provide a lockable valve attachment for use with air brakes on large trucks to provide a practical enhancement to air brake systems which would effectively close and lock the brake valve, preventing the valves from opening and the vehicle from moving, when the truck is parked and being loaded or unloaded.

The braking control system for a trailer preferably comprises an input air supply line, an output air supply line, and a valve mechanism having an elongated main chamber body that includes an input aperture through one end adapted to be releasably connected with the input air supply line and adapted to allow air to pass into the main chamber body, an output aperture through the opposite end thereof adapted to releasably connect with the output air supply line and adapted to allow air to pass out from the main chamber body, an air passageway therethrough along the length thereof and connected between the input and output apertures and adapted to selectively allow air to pass therethrough, a valve handle aperture through an upper portion thereof located in the middle section thereof and connected to the air passageway, and an air exhaust aperture through the lower portion thereof and located in the middle section thereof that is in axial alignment with the valve handle aperture and is connected to the air passageway, and adapted to allow air to pass outwardly from the main chamber body.

A valve member is located within the air passageway of the main chamber body in between the valve handle aperture and the air exhaust aperture that is adapted to move between the open position allowing air to pass through the air passageway and out through the output aperture, and the closed position blocking air from passing through the air passageway and out through the output aperture and redirecting the air through the air exhaust aperture. The valve handle is connected to the valve handle aperture and extends therethrough and is mechanically connected to the valve member such that the valve handle can be manipulated by hand and is adapted to move the valve member into the open and closed positions. The braking control system is adapted to be connected between a compressed air supply and the braking system of a trailer to thereby enable and to disable the braking system by hand via compressed air.

A locking member is securely attached to the outer surface of the main chamber body adjacent to the valve handle that includes a lock aperture therethrough that is adapted to pass through the lock aperture of the valve handle to thereby lock the valve handle in a closed position. The elongated main chamber body is approximately 10 inches in length, 8 inches in height, and 1½ inches in depth and has an interior hollow volume having a cylindrical shape.

The input air supply line and the output air supply line are preferably 300 psi rated air-lines. Releasable connections between respective input air supply lines and output air supply lines and the input and output apertures of the main chamber body are formed by elbow joint members. The elbow joint members may be formed from brass or from other suitable high strength materials. The main chamber body is preferably formed from a material chosen from the group of materials consisting of brass, steel, stainless steel, aluminum, and ceramic.

The combination of a trailer and a braking control system for a trailer may have a trailer including a main frame, a compressed air source connected to the main frame, at least one axle member attached to the main frame, a plurality of wheel assemblies that are respectively and rotatably attached to opposite ends of each of the axle member(s), and a plurality of brake assemblies that are respectively and mechanically connected to the opposite ends of each of the axle members and are adapted to releasably and frictionally engage each respective wheel assembly to thereby stop and prevent rotation of the wheel assemblies. Each of the brake assemblies include an air supply aperture and an air supply line receiver member adapted to releasably connect with the output air supply line of the braking control system and allow compressed air to pass therethrough and control the plurality of brake assemblies.

The braking control system preferably comprises an input air supply line releasably connected to the compressed air source, an output air supply line releasably connected to each of the brake assemblies, and a valve mechanism comprising an elongated main chamber body including an input aperture through one end thereof adapted to releasably connect with the input air supply line and adapted to allow air to pass into the main chamber body, an output aperture through an opposite end adapted to releasably connect with the output air supply line and adapted to allow air to pass out from the main chamber body, an air passageway therethrough along the length thereof and connected between said input and output apertures and adapted to selectively allow air to pass there through, a valve handle aperture through an upper portion thereof and located in the middle section and connected to the air passageway, and an air exhaust aperture through a lower portion thereof and located in the middle section thereof in axial alignment with the valve handle aperture which is connected to the air passageway and adapted to allow air to pass outwardly from the main chamber body.

A valve member located within the air passageway of the main chamber body in between the valve handle aperture and the air exhaust aperture is adapted to move between an open position allowing air to pass through the air passageway and out through the output aperture, and the closed position blocking air from passing through the air passageway and out through the output aperture and redirecting the air through the air exhaust aperture.

A valve handle connected to the valve handle aperture extends therethrough and is mechanically connected to the valve member such that the valve handle can be manipulated by hand and is adapted to move the valve member into the open and closed positions. The braking control system is adapted to enable and disable each brake assembly by hand via compressed air.

The combination of a trailer and a braking control system further comprises a locking member securely attached onto the outer surface of the main chamber body adjacent the valve handle and includes a lock aperture therethrough. The valve handle also includes a lock aperture therethrough and a lock member is adapted to pass through the lock apertures of the locking member to thereby lock the valve handle in the closed position. The elongated main chamber body is approximately 10 inches in length, 8 inches in height, and 1½ inches in depth. The interior hollow volume of the main chamber body is formed having a cylindrical shape. The input air supply line and the output air supply line are preferably formed as 300 psi air-lines.

Releasable connections between each respective input air supply line and output air supply line, and the input and output apertures of the main chamber body may be formed with elbow joint members. The elbow joint members may be formed from brass and the main chamber body is preferably formed from a material chosen from the group of materials consisting of brass, steel, stainless steel, aluminum, and ceramic.

The present invention holds significant improvements and serves as a braking control system for a trailer. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, braking control system for a trailer, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a braking system and more particularly to a braking control system for a trailer as used to improve the safety and convenience of loading trailers safely via a lockable valve attachment for use with air brakes on large trucks to provide a practical enhancement to air brake systems which would effectively close and lock the brake valve, preventing the valves from opening and the vehicle from moving, when the truck is parked and being loaded or unloaded.

Generally speaking, a braking control system for a trailer is a braking system on a semi trailer with the brake application handle located at the inside rear of the trailer. The handle has a locking member so that personnel loading the trailer are able to apply and lock the brakes on the trailer, and only the person(s) holding the key are able to release the brakes. The system prevents the trailer from moving away from the dock plate and having the dock plate fall through the space between the moved trailer and the dock, injuring personnel and/or damaging equipment.

Figure 1:
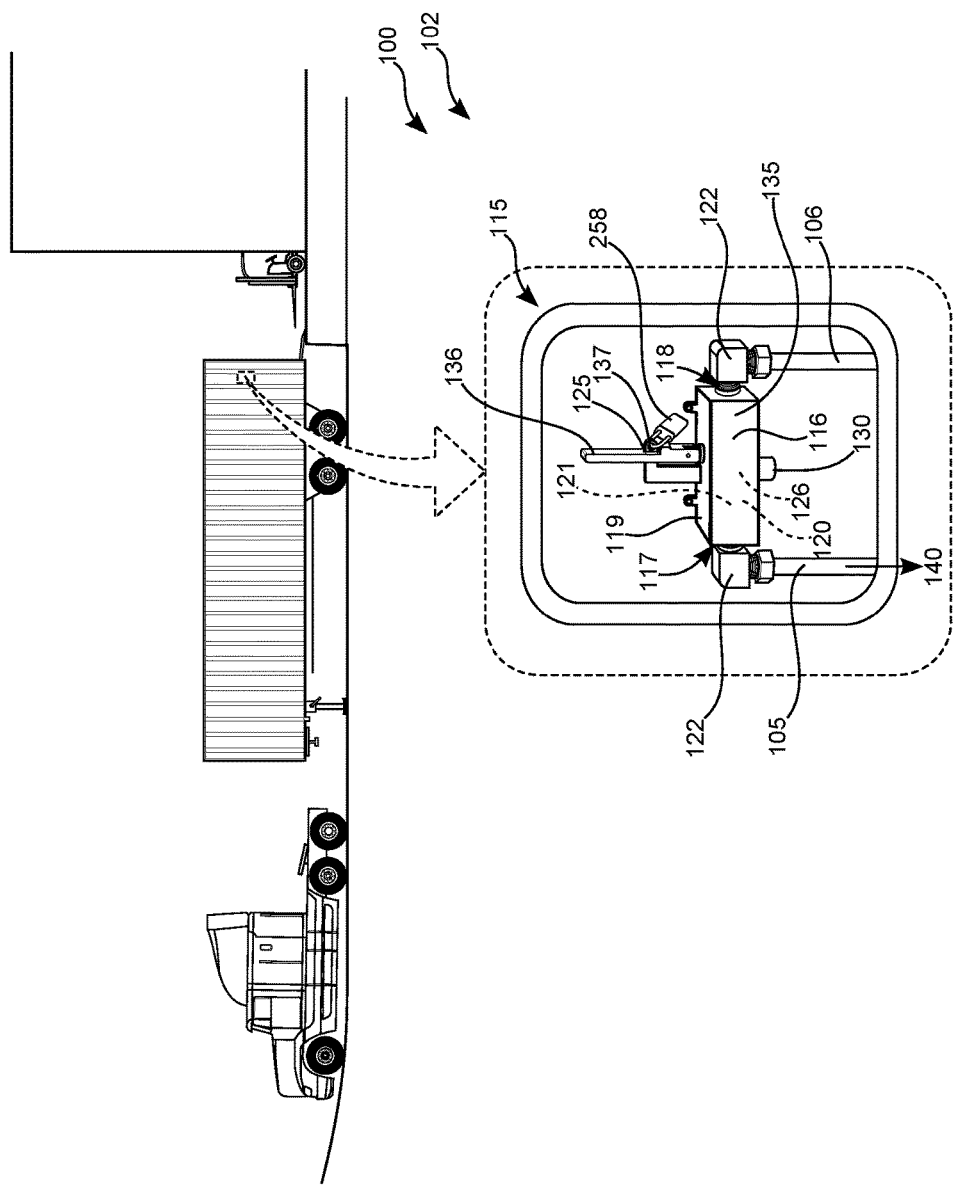
FIG. 1 shows a perspective view illustrating a braking control system for a trailer according to an embodiment of the present invention.

In greater detail now, referring to the drawings by numerals of reference there is shown in FIG. 1, a perspective view illustrating braking control system for a trailer 100 according to an embodiment of the present invention.

Braking control system for a trailer 100 preferably comprises input air supply line 105, output air supply line 106, and valve mechanism 115 having an elongated main chamber body 116 that includes input aperture 117 through one end adapted to be releasably connected with input air supply line 105 and adapted to allow air to pass into main chamber body 116, output aperture 118 through opposite end thereof adapted to releasably connect with output air supply line 106 and adapted to allow air to pass out from main chamber body 116, an air passageway 120 therethrough along the length thereof and connected between input 117 and output apertures 118 and adapted to selectively allow air to pass therethrough, valve handle aperture 125 through an upper portion thereof located in middle section 126 thereof and connected to air passageway 120, and air exhaust aperture 130 through a lower portion thereof and located in middle section 126 thereof that is in axial alignment with valve handle aperture 125 and is connected to air passageway 120, and adapted to allow air to pass outwardly from main chamber body 116.

Figure 2:
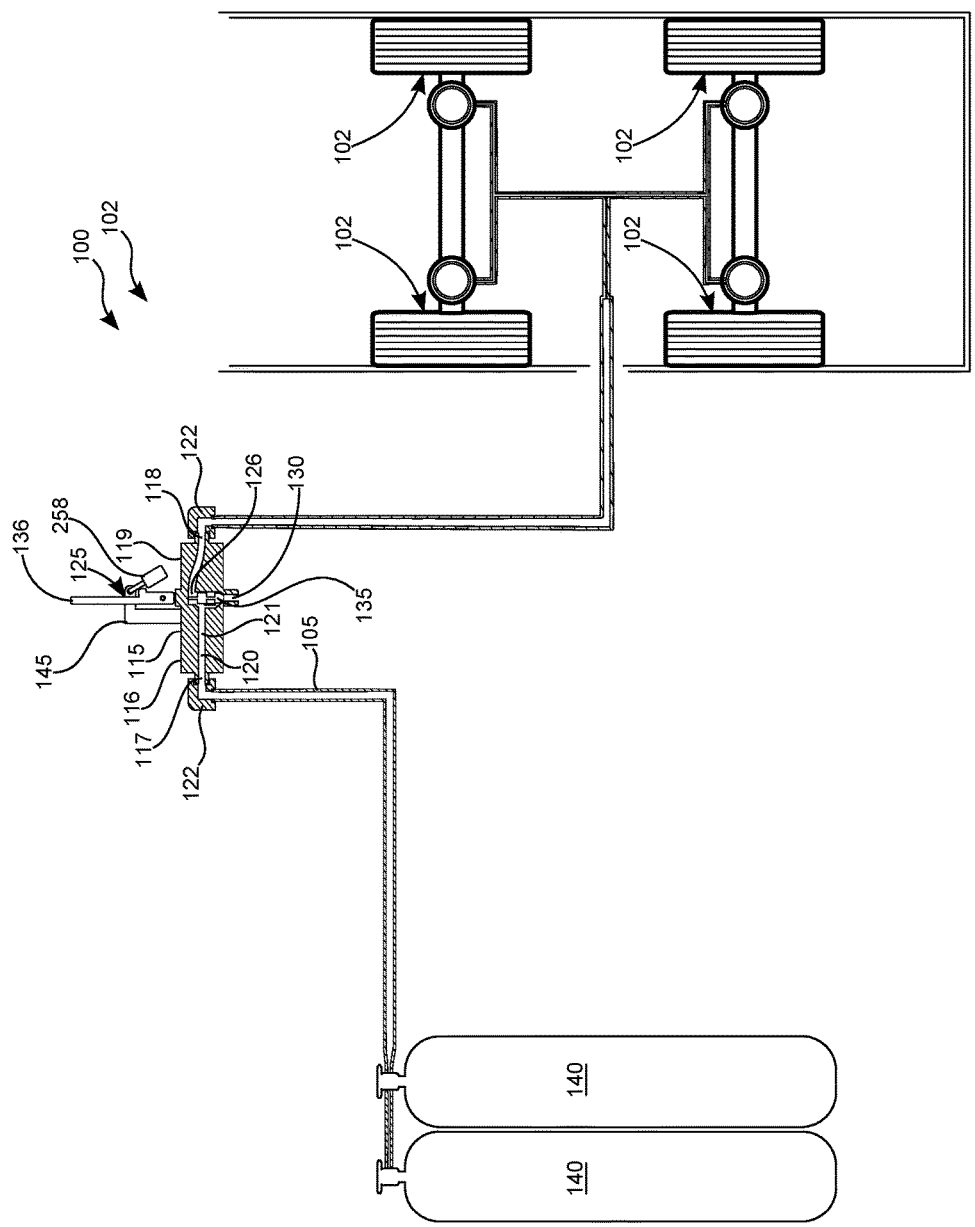
FIG. 2 is a diagram illustrating a braking control system for a trailer according to an embodiment of the present invention of FIG. 1.

Referring now to FIG. 2, is a diagram illustrating braking control system for a trailer 100 according to an embodiment of the present invention of FIG. 1.

Valve member 135 is located within air passageway 120 of main chamber body 116 in between valve handle aperture 125 and air exhaust aperture 130 that is adapted to move between the open position allowing air to pass through air passageway 120 and out through output aperture 118, and the closed position blocking air from passing through air passageway 120 and out through output aperture 118 and redirecting the air through air exhaust aperture 130. Valve handle 136 is connected to valve handle aperture 125 and extends therethrough and is mechanically connected to valve member 135 such that valve handle 136 can be manipulated by hand and is adapted to move valve member 135 into the open and closed positions. Braking control system for a trailer 100 is adapted to be connected between compressed air supply 140 and trailer braking system 102 to thereby enable and to disable trailer braking system 102 by hand via compressed air.

Locking member 145 is securely attached to the outer surface of main chamber body 116 adjacent to valve handle 136 and includes lock aperture 137 therethrough that is adapted to pass through valve handle aperture 242 of valve handle 136 to thereby lock valve handle 136 in a closed position. The elongated main chamber body 116 is approximately 10 inches in length, 8 inches in height, and 1½ inches in depth and has an interior hollow volume having a cylindrical shape.

Input air supply line 105 and output air supply line 106 are preferably 300 psi rated air-lines. Releasable connections between respective input air supply line 105 and output air supply lines 106 and the input 117 and output apertures 118 of main chamber body 116 are formed by elbow joint members 122. Elbow joint members 122 may be formed from brass or from other suitable high strength materials. Main chamber body 116 is preferably formed from a material chosen from the group of materials consisting of brass, steel, stainless steel, aluminum, and ceramic.

Figure 3:
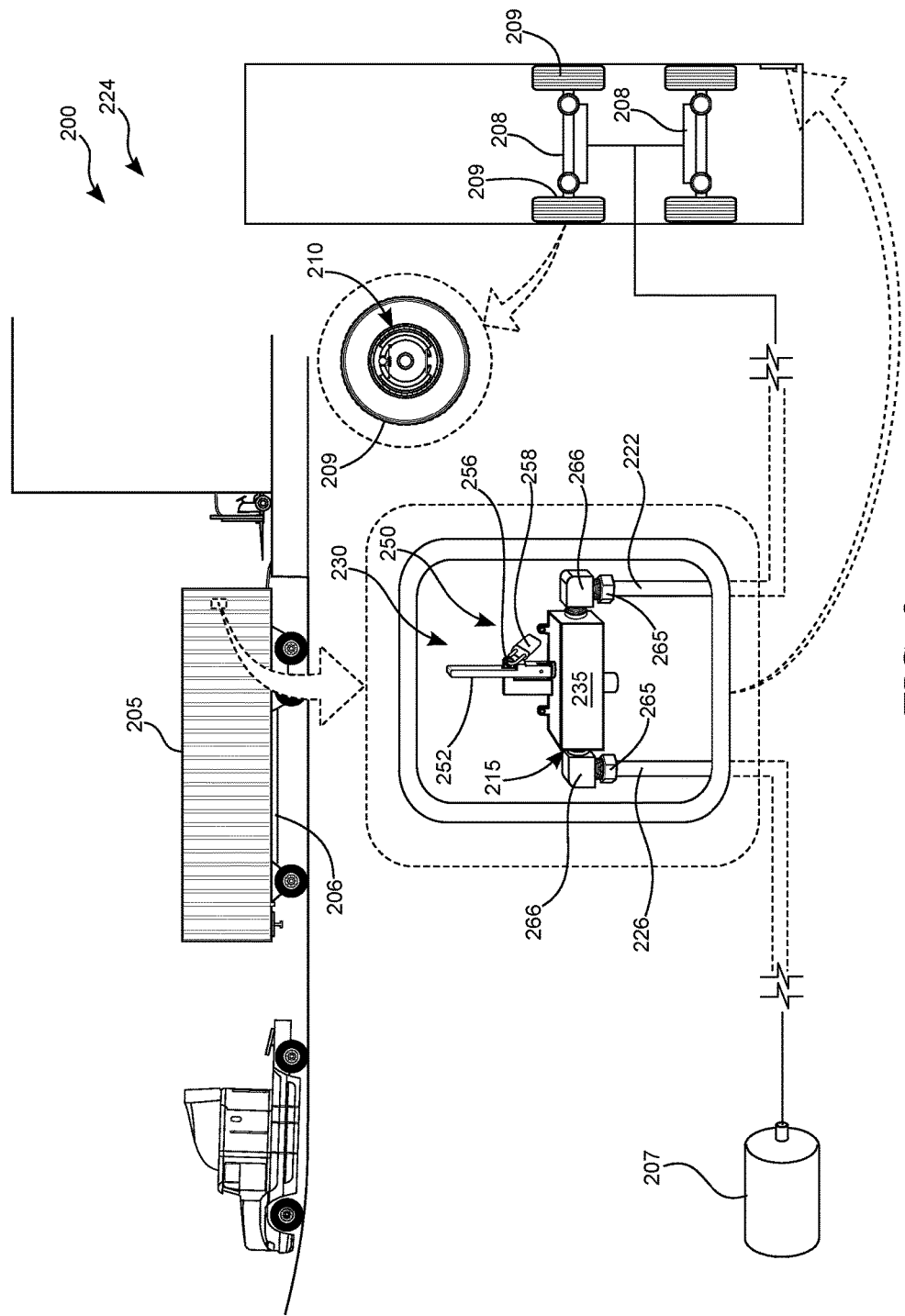
FIG. 3 is a perspective view illustrating a combination of a trailer and a braking control system for a trailer according to an embodiment of the present invention of FIG. 1.

Referring now to FIG. 3, is a perspective view illustrating combination of a trailer and a braking control system for said trailer 200 according to an embodiment of the present invention of FIG. 1.

Combination of a trailer and a braking control system for said trailer 200 may have trailer 205 including main frame 206, compressed air source 207 connected to main frame 206, at least one axle member 208 attached to main frame 206, a plurality of wheel assembly(s) 209 that are respectively and rotatably attached to opposite ends of each of axle member(s) 208, and a plurality of brake assembly(s) 210 that are respectively and mechanically connected to the opposite ends of each of axle member(s) 208 and are adapted to releasably and frictionally engage each respective wheel assembly(s) 209 to thereby stop and prevent rotation of wheel assembly(s) 209. Each of brake assembly(s) 210 include air supply aperture 215 and air supply line receiver member 220 adapted to releasably connect with output air supply line 222 of braking control system 224 and allow compressed air to pass therethrough and control the plurality of brake assembly(s) 210.

Figure 4:
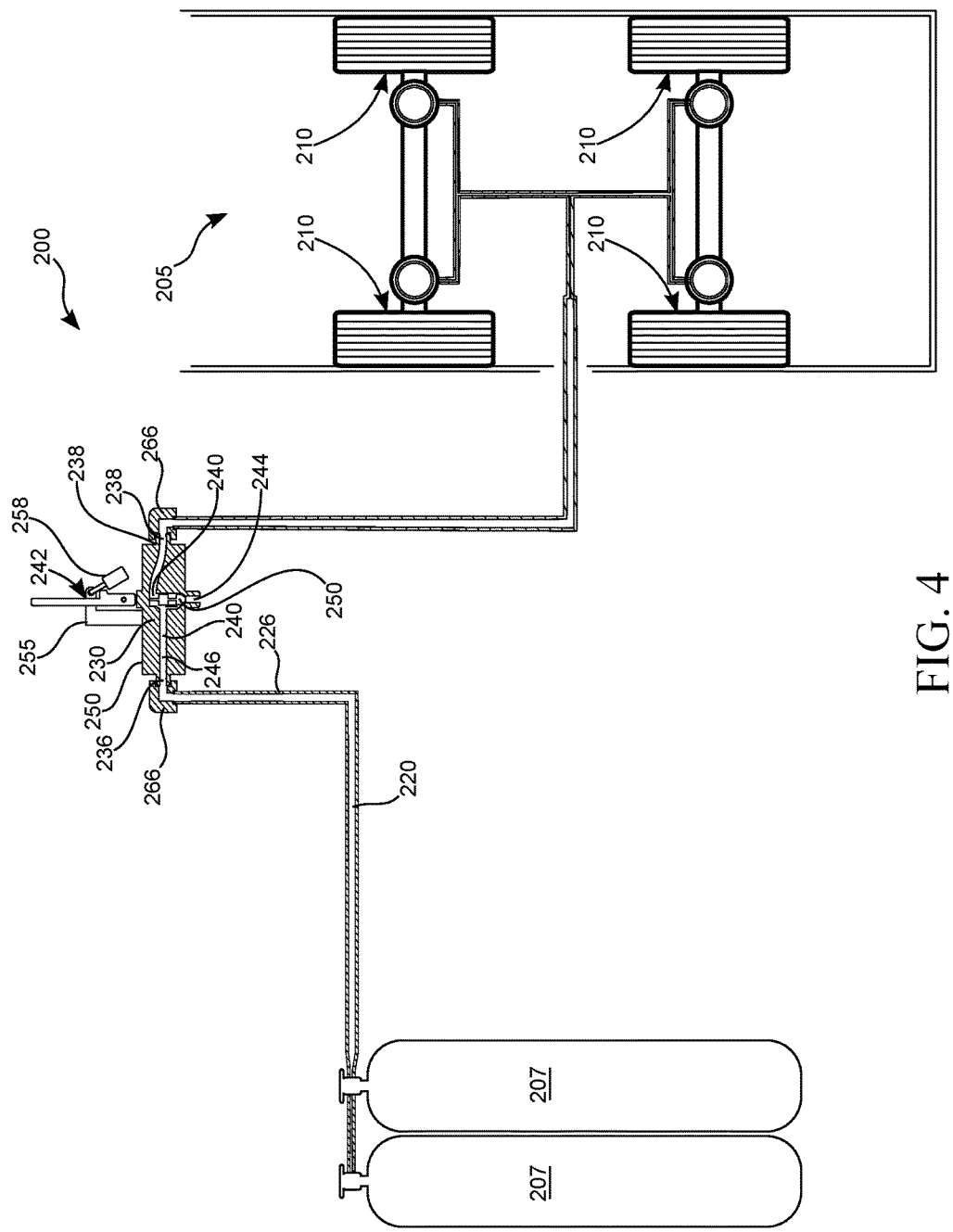
FIG. 4 is a diagram illustrating the combination of a trailer and a braking control system for a trailer according to an embodiment of the present invention of FIG. 1.

Referring now to FIG. 4, showing a diagram illustrating combination of a trailer and a braking control system for said trailer 200 according to an embodiment of the present invention of FIG. 1.

Braking control system 224 preferably comprises input air supply line 226 releasably connected to compressed air source 207, output air supply line 222 releasably connected to each of brake assembly(s) 210, and valve mechanism 230 comprising main chamber body 235 including input aperture 236 through one end thereof adapted to releasably connect with input air supply line 226 and adapted to allow air to pass into main chamber body 235, output aperture 238 through an opposite end adapted to releasably connect with the output air supply line 222 and adapted to allow air to pass out from main chamber body 235, air passageway 240 therethrough along the length thereof and connected between input aperture 236 and output aperture 238 and adapted to selectively allow air to pass there through, valve handle aperture 242 through an upper portion thereof and located in the middle section and connected to air passageway 240, and air exhaust aperture 244 through a lower portion thereof and located in the middle section thereof in axial alignment with valve handle aperture 242 which is connected to air passageway 240 and adapted to allow air to pass outwardly from main chamber body 235.

Valve member 250 located within air passageway 240 of main chamber body 235 in between valve handle aperture 242 and air exhaust aperture 244 is adapted to move between an open position allowing air to pass through air passageway 240 and out through output aperture 238, and the closed position blocking air from passing through air passageway 240 and out through output aperture 238 and redirecting the air through air exhaust aperture 244.

Valve handle 252 includes valve handle aperture 242 extending therethrough and is mechanically connected to valve member 250 such that valve handle 252 can be manipulated by hand and is adapted to move the valve member into the open and closed positions. Braking control system 224 is adapted to enable and disable each brake assembly(s) 210 by hand via compressed air.

Combination of a trailer and a braking control system for said trailer 200 further comprises locking member 255 securely attached onto the outer surface of main chamber body 235 adjacent valve handle 252 and includes lock aperture 256 therethrough. Valve handle 252 also includes a lock aperture 242 therethrough and lock member 258 is adapted to pass through lock apertures 256 of locking member 255 to thereby lock valve handle 252 in the closed position. The elongated main chamber body 235 is approximately 10 inches in length, 8 inches in height, and 1½ inches in depth. Interior hollow volume 246 of main chamber body 235 is formed having a cylindrical shape. Input air supply line 226 and output air supply line 222 are preferably formed as 300 psi air-lines.

Releasable connections 265 between each respective input air supply line 226 and output air supply line 222, and input aperture 236 and output aperture 238 of main chamber body 235 may be formed with elbow joint members 266. Elbow joint members 266 may be formed from brass and main chamber body 235 is preferably formed from a material chosen from the group of materials consisting of brass, steel, stainless steel, aluminum, and ceramic.

Braking control system for a trailer 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other contents or arrangements such as, for example, including more or less components, customized parts, different color combinations, parts may be sold separately, etc., may be sufficient.

Under appropriate circumstances, considering such issues as design preference, user preferences, marketing preferences, cost, structural requirements, available materials, technological advances, etc., other material of construction such as, for example, different metals within the above-mentioned list, elimination or addition of certain components, including or excluding certain methods of use, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A combination of a trailer and a braking control system for said trailer, said combination comprising:
    the trailer including:
        a main frame;
        a compressed air source;
            wherein said compressed air source is connected to said main frame
        at least one axle member;
            wherein said at least one axle member is attached to said main frame;
        a plurality of wheel assemblies;
            wherein said plurality of wheel assemblies are respectively rotatably
            attached to opposite ends of each of said at least one axle member; and
        a plurality of brake assemblies; wherein said plurality of brake assemblies are respectively mechanically connected to said opposite ends of each of said at least one axle member and are adapted to releasably and frictionally engage each respective said plurality of wheel assemblies to thereby stop and prevent rotation of said plurality of wheel assemblies; and
        wherein each of said plurality of brake assemblies includes an air supply aperture and an air supply line receiver member adapted to releasably connect with an output air supply line of the braking control system and allow compressed air to pass there through and control said plurality of brake assemblies; and
    the braking control system comprising:
        an input air supply line;
            wherein said input air supply line is releasably connected to said compressed air source; and
            said output air supply line is releasably connected to each of said plurality of brake assemblies; and
        a valve mechanism comprising:
            an elongated main chamber body including:
                an input aperture through one end thereof adapted to releasably connect with said input air supply line and adapted to allow air to pass into said main chamber body;
                an output aperture through an opposite end thereof adapted to releasably connect with said output air supply line and adapted to allow air to pass out from said main chamber body;

an air passageway there through along a length thereof and connected between said input and output apertures and adapted to selectively allow air to pass there through;

an air exhaust aperture through a lower portion thereof, is connected to said air passageway, and is adapted to allow air to pass outwardly from said main chamber body;

a valve member;

wherein said valve member is located within said air passageway of said main chamber body and adapted to move between an open position allowing air to pass through said air passageway and out through said output aperture and a closed position blocking air from passing through said air passageway and out through said output aperture and redirecting said air through said air exhaust aperture;

a valve handle;

wherein said valve handle is mechanically connected to said valve member, such that said valve handle can be manipulated by hand and is adapted to move said valve member into said open and closed positions;

wherein said braking control system is adapted to enable and disable each said plurality of brake assemblies by hand via compressed air;

further comprising:

a locking member securely attached to an outer surface of said main chamber body adjacent said valve handle, said locking member including a lock aperture there through;

wherein said valve handle includes a lock aperture there through;

said locking member adapted to pass through the valve handle lock aperture when in a closed position;

and a lock member adapted to pass through said lock aperture of said locking member when said valve handle is in the closed position to thereby lock said valve handle in said closed position, and thereby lock the plurality of brake assemblies on the trailer.

2. The braking control system of claim 1, wherein the lock member is adapted to pass through said lock aperture of said locking member when said valve handle is in the closed position to thereby lock said valve handle in said closed position, and thereby lock the brake assemblies on the trailer, such that a key is needed to unlock the brake assemblies on the trailer.

3. The braking control system of claim 1, wherein said elongated main chamber body is approximately 10 inches in length, 8 inches in height, and 1½ inches in depth.

4. The braking control system of claim 1, wherein an interior hollow volume of said main chamber body is formed having a cylindrical shape.

5. The braking control system of claim 1, wherein said input air supply line and said output air supply line are formed as 300 psi air-lines.

6. The braking control system of claim 1, wherein said releasably connections between respective said input air supply line and said output air supply line and said input and output apertures of said main chamber body are formed by elbow joint members.

7. The braking control system of claim 6, wherein said elbow joint members are formed from brass.

8. The braking control system of claim 1, wherein said main chamber body formed from a material chosen from a group of materials consisting of brass, steel, stainless steel, aluminum, and ceramic.

* * * * *